United States Patent
Min et al.

(10) Patent No.: US 6,358,635 B1
(45) Date of Patent: Mar. 19, 2002

(54) MAGNETIC RECORDING SENSOR WITH STABILIZING SHIELD

(75) Inventors: Tai Min, San Jose; Otto Voegeli, Morgan Hill; Rongfu Xiao, Fremont; Cherng-Chyi Han; Po-Kang Wang, both of San Jose, all of CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/467,138

(22) Filed: Dec. 20, 1999

(51) Int. Cl.$^7$ .................................................. G11B 5/66
(52) U.S. Cl. ............ 428/692; 428/694 R; 428/694 TM; 428/694 TS; 428/336; 428/900; 360/113
(58) Field of Search ............................ 428/692, 694 R, 428/694 TM, 694 TS, 900, 336; 360/113

(56) References Cited

U.S. PATENT DOCUMENTS

| | | | |
|---|---|---|---|
| 4,103,315 A | * 7/1978 | Hempstead | 360/110 |
| 5,858,548 A | * 4/1994 | Dill | 360/113 |
| 5,475,550 A | * 12/1995 | George | 360/113 |
| 5,828,530 A | 10/1998 | Gill et al. | 360/113 |
| 5,883,763 A | 3/1999 | Yuan et al. | 360/113 |
| 5,898,548 A | 4/1999 | Dill et al. | 360/113 |
| 6,087,027 A | * 7/2000 | Hoshiya | 428/692 |

* cited by examiner

*Primary Examiner*—Leszek Kiliman
(74) *Attorney, Agent, or Firm*—George O. Saile; Stephen B. Ackerman; Larry J. Prescott

(57) ABSTRACT

A magnetic shielding element for a magnetic recording and sensing device which prevents the problem of pop-corn noise or covariance of amplitude noise in the magnetic sensing device. The shielding element has a layer of anti-ferromagnetic exchange material formed on a layer of single domain first ferromagnetic material. The single domain first ferromagnetic material is stabilized by the antiferromagnetic exchange material. A layer of non-magnetic metal is then formed on the layer of antiferromagnetic exchange material and a layer of second ferromagnetic material is formed on the layer of non-magnetic metal to complete the shielding element. When the single domains of the first ferromagnetic material are disturbed by the strong magnetic fields of a write cycle they relax with a relaxation time of pico seconds and are fully relaxed before a read cycle begins. The fully relaxed layer of first ferromagnetic material then shields the magnetic sensing device from magnetic field fluctuations caused by the slower relaxation of the domains in the layer of second ferromagnetic material during a read cycle.

28 Claims, 3 Drawing Sheets

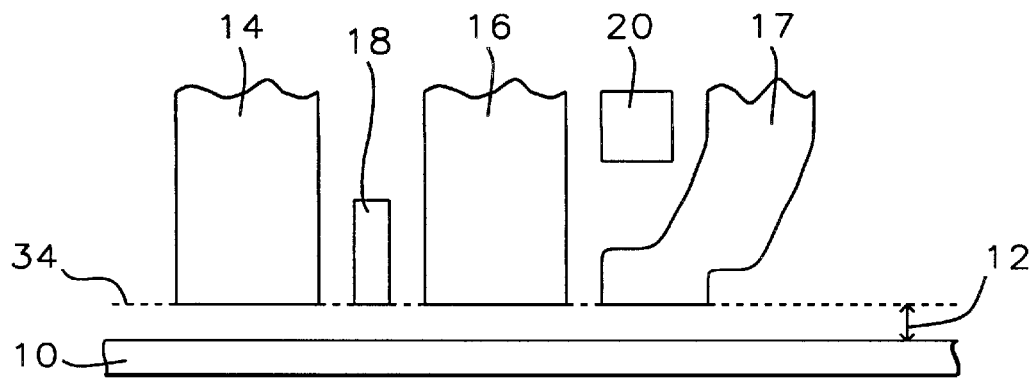
FIG. 1 — Prior Art
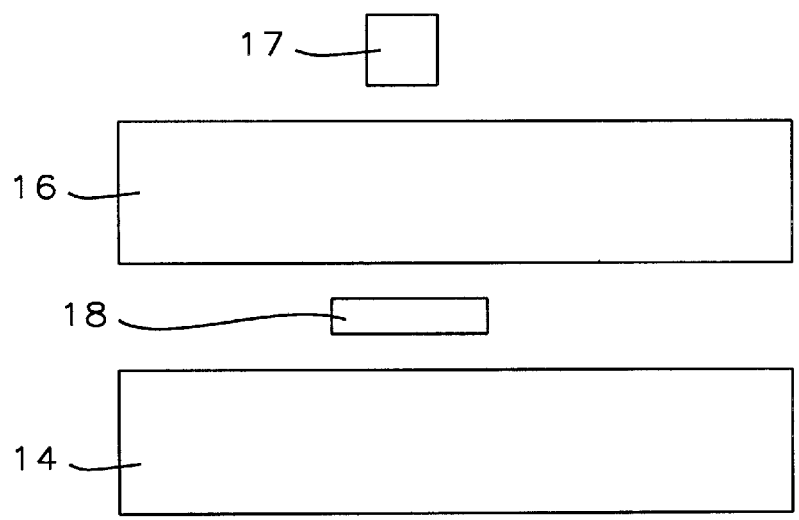
FIG. 2 — Prior Art

MAGNETIC RECORDING SENSOR WITH STABILIZING SHIELD

BACKGROUND OF THE INVENTION

(1) Field of the Invention

This invention relates to magnetic shielding of a magnetic sensing device and more particularly to a magnetic shield using a layer of single domain ferromagnetic material, formed on a layer of antiferromagnetic exchange material to stabilize the single domain nature of the ferromagnetic material, as a key part of the shield.

(2) Description of the Related Art

One of the major challenges of magnetic recording and sensing devices, such as those devices using spin valve, anisotropic magnetoresistive, spin dependent tunneling magnetic sensor devices is the amplitude stability of the sense current after write excitation. The strong field used for write excitation can rearrange the domain patterns of the shields shielding the magnetic sensor device. After the writing cycle has been completed the domains in the shield will relax to their final domain state, Since these shields are magnetically coupled to the magnetic sensor device, this relaxation of the domains to the final domain state will cause noise, such as pop-corn noise and covariance of amplitude noise, in the sense current.

U.S. Pat. No. 5,898,548 to Dill et al. describes a magnetic recording system with a magnetic tunnel junction magnetoresistive read head located between two spaced-apart magnetic shields. Electrically conductive spacer layers are located at the top and bottom of the magnetic tunnel junction device and connect the magnetic tunnel junction device to the shields.

U.S. Pat. No. 5,828,530 to Gill et al. describe a spin valve sensor device wherein the spin valve sensor is asymmetrically located between first and second shield layers so that image currents from the first and second shield layers partially or completely counterbalances a stiffening field from antiferromagnetic, pinned, and spacer layers.

U.S. Pat. No. 5,883,763 to Yuan et al. describes a read/write head having a giant magnetoresistive sensor biased by permanent magnets located between the giant magnetoresistive element and the pole shields.

SUMMARY OF THE INVENTION

In most magnetic recording and sensing devices the sensing device and writing device are packaged in the same recording/sensing head. This close proximity of the sensing and writing device, along with other reasons, requires the use of magnetic shields around the magnetic sensing device. A conventional shielding arrangement is shown schematically in FIGS. 1 and 2. FIG. 1 shows a magnetic sensing device 18 disposed between a first magnetic shielding element 14 and a second magnetic shielding element, wherein both the first and second magnetic shielding elements are ferromagnetic material. A magnetic writing device 20, such as an inductive coil, is shown between the second magnetic shielding element 16, which typically also functions as a first pole piece for the writing means and a second pole piece 17 for the writing means. The magnetic sensing device 18 and the ends of the pole pieces are located a first distance 12 from the magnetic recording media 10, such as a magnetic disk.

FIG. 2 shows a view of the magnetic recording and sensing device looking out of and perpendicular to the magnetic recording media 10 of FIG. 1. The view of FIG. 2 is a taken perpendicular to the view shown in FIG. 1. FIG. 2 shows the magnetic sensing device 18 between the conventional first magnetic shielding element 14 and conventional second magnetic shielding element 16. The conventional second magnetic shielding element 16 is shown between the magnetic sensing unit 18 and the second pole piece 17.

One of the problems encountered in the conventional shielding arrangement is that the strong magnetic fields used for writing data into the magnetic media can rearrange the domain patterns of the first shielding element 14 and the second shielding element 16 used to shield the magnetic sensing device 18. After the writing cycle has been completed the domains in the first and second shield elements will relax to their final domain state. Since these shields are magnetically coupled to the magnetic sensor device 18, this relaxation of the domains to the final domain state will cause magnetic field fluctuations at the magnetic sensor device 18.

The magnetic sensing device 18 comprises sensing elements such as a spin valve, anisotropic magnetoresistive, spin dependent tunneling magnetic sensing head or other giant magnetoresistive magnetic sensing head which are sensitive to the magnetic field fluctuations. These magnetic field fluctuations caused by the relaxing of the domains to their final state in the first and second shield elements will cause noise, such as pop-corn noise and covariance of amplitude noise, in the sense signal from the magnetic sensing device and complicate the process of reading the data stored in the magnetic media.

It is a principle objective of this invention to provide a magnetic shielding element which will not cause noise in the sensing signal of a magnetoresistive sensing device because of domains in the shielding material relaxing to their final state.

It is another principle objective of this invention to provide a magnetic recording and sensing device which will not have noise in the sensing signal of a magnetoresistive sensing device because of domains in the material used to shield the magnetic sensing device relaxing to their final state.

These objectives are achieved by forming new shielding elements. These shielding elements have a layer of antiferromagnetic exchange material formed on a layer of first ferromagnetic material. The first ferromagnetic material is stabilized by the antiferromagnetic exchange material to form a single domain state. A layer of non-magnetic metal is then formed on the layer of antiferromagnetic exchange material. A layer of second ferromagnetic material is then formed on the layer of non-magnetic metal to complete the shield element. The shield element is also the first pole piece of the magnetic writing means.

The magnetic fields used during the writing cycle will disturb both the domains in the layer of single domain first ferromagnetic material and the layer of second ferromagnetic material. However, the domains in the single domain first ferromagnetic material will relax to its single domain state with a relaxation time of pico seconds so that the single domain first ferromagnetic material will be completely relaxed to its single domain state before any data is read by the magnetic sensing device. The magnetic shielding elements are arranged so that the magnetic sensing device is between two magnetic shielding elements wherein the layer of single domain first ferromagnetic material of each shielding element is adjacent to the magnetic sensing device. The layer of single domain first ferromagnetic material of each shielding element shields the magnetic sensing device from the slower relaxation of the domains of the second ferromagnetic layer in each of the shielding elements. This arrangement shields the magnetic sensing device from magnetic field fluctuations and the problems of pop-corn noise and covariance of amplitude noise during readback of data from the disk are avoided.

BRIEF DESCRIPTION OF THE DRAWINGS

FIG. 1 shows a schematic view of a conventional magnetic shielding arrangement for a magnetic recording and sensing device.

FIG. 2 shows another schematic view of a conventional magnetic shielding arrangement for a magnetic recording and sensing device.

DESCRIPTION OF THE PREFERRED EMBODIMENTS

Figure 3A:
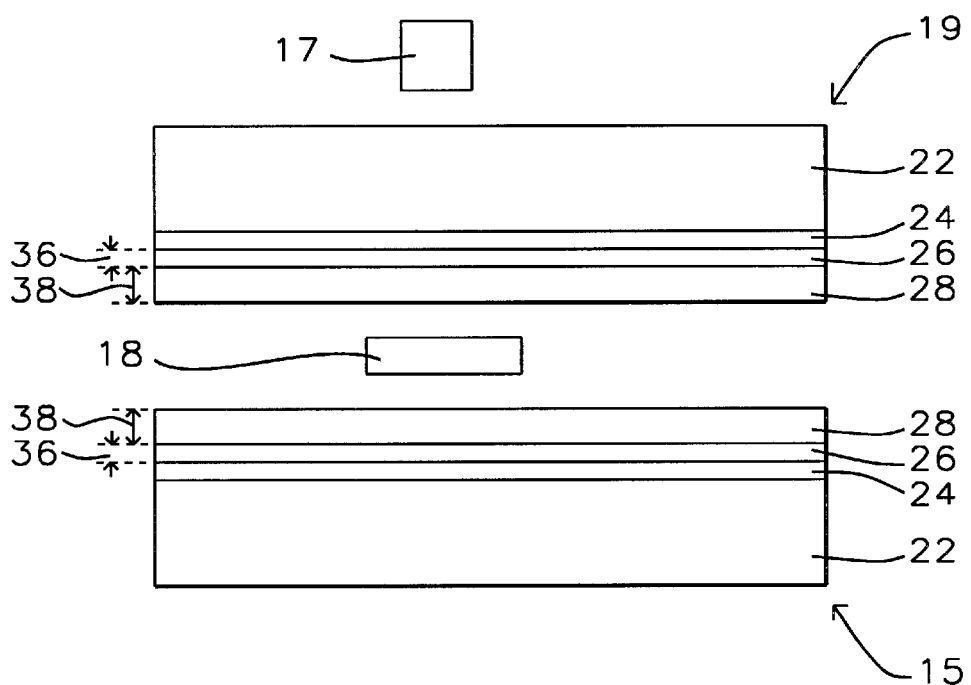
FIG. 3A shows a schematic view of the magnetic shielding arrangement of this invention for a magnetic recording and sensing device using two composite shielding elements.

Refer now to FIG. 3A for a description of a first embodiment of the magnetic shielding arrangement of this invention. FIG. 3A shows a view of the shielding arrangement looking out of the magnetic media 10 shown in FIG. 1. FIG. 3A shows a magnetic sensing device 18 between a first magnetic shielding element 19 and a second magnetic shielding element 15. The first magnetic shielding element 19 is between the magnetic sensing device 18 and the second pole piece 17 of the magnetic writing means. The first magnetic shielding element 19 also serves as the first pole piece of the magnetic writing means. The magnetic sensing device 18 comprises sensing elements such as a spin valve, anisotropic magnetoresistive, spin dependent tunneling magnetic sensing head or other giant magnetoresistive magnetic sensing head.

As shown in FIG. 3A, the magnetic sensing device 18 is between the first magnetic shielding element 19 and the second magnetic shielding element 15. In this embodiment the first magnetic shielding element 19 and the second magnetic shielding element 15 have the same construction. As shown in FIG. 3A, both the first magnetic shielding element 19 and the second magnetic shielding element 15 have a layer of first ferromagnetic material 28 having a first thickness 38. The layer of first ferromagnetic material 28 is formed on a layer of antiferromagnetic exchange material 26 having a second thickness 36. The layer of first ferromagnetic material 28 is stabilized by the layer of antiferromagnetic exchange material 26 to form a single domain state. The antiferromagnetic exchange material 26 must be oriented so that the pinning field strength is parallel to the air bearing surface. The air bearing surface is shown as a dashed line 34 in FIG. 1 and in FIG. 3A is parallel to the plane of the paper.

The first thickness 38 and second thickness 36 must be optimized so that the pinning field strength is strong enough to prevent multi-domain states in the single domain first ferromagnetic material 28 but not strong enough to significantly lower the permeability of the single domain first ferromagnetic material 28. In this example the first thickness 38 is between about 1000 and 5000 Angstroms and the second thickness 36 is between about 50 and 500 Angstroms. The first ferromagnetic material 28 can be regular permalloy like, $Ni_{80}Fe_{20}$, or a high $B_s$ material, like $Ni_{45}Fe_{55}$. The first ferromagnetic material 28 can be one or a combination of two or more of Ni, NiFe, Co, CoFe, CoZrTa, CoZrNb, FeN, PeNAl, FeNTa, FeNNb, or FeNZr. The antiferromagnetic exchange material 26 can be one of either IrMn, RhMn, RuMn, RuRhMn, FeMn, FeMnRh, FeMnCr, CrPtMn, TbCo, NiMn, PtMn, PtPdMn, NiO, CoO, or CoNiO.

As shown in FIG. 3A a layer of non-magnetic metal 24 is then formed on the layer of antiferromagnetic exchange material 26. The non-magnetic metal can be one of either V, Nb, Ta, Ti, Zr, Hf, Mo, W, or Cr. A layer of second ferromagnetic material 22 is then formed on the layer of antiferromagnetic exchange material 26. The second ferromagnetic material 22 can be one or a combination of two or more of Ni, NiFe, Co, CoFe, CoZrTa, CoZrNb, FeN, FeNAl, FeNTa, FeNNb, or FeNZr.

As shown in FIG. 3A, the first magnetic shielding element 19, the second magnetic shielding element 15, and the magnetic sensing device 18 are arranged so that the magnetic sensing device 18 is between the first magnetic shielding element 19 and the second magnetic shielding element 15, the layer of single domain first ferromagnetic material 28 of the first shielding element 19 is adjacent to the magnetic sensing device 18, and the layer of single domain first ferromagnetic material 28 of the second shielding element 15 is adjacent to the magnetic sensing device 18.

The magnetic fields used during the writing cycle will disturb both the domains in the layer of single domain first ferromagnetic material 28 and the layer of second ferromagnetic material 22. However, the domains in the single domain first ferromagnetic 28 material will relax to its single domain state with a relaxation time of pico seconds so that after a write cycle the single domain first ferromagnetic material 28 will be completely relaxed to its single domain state before any data is read by the magnetic sensing device 18. This relaxed layer of single domain first ferromagnetic material 28 will shield the magnetic sensing device 18 from field fluctuations due to domain relaxation in the layer of second ferromagnetic material 22 during read cycles which occur before the domains in the layer of second ferromagnetic material 22 have reverted to their relaxed state.

Figure 3B:
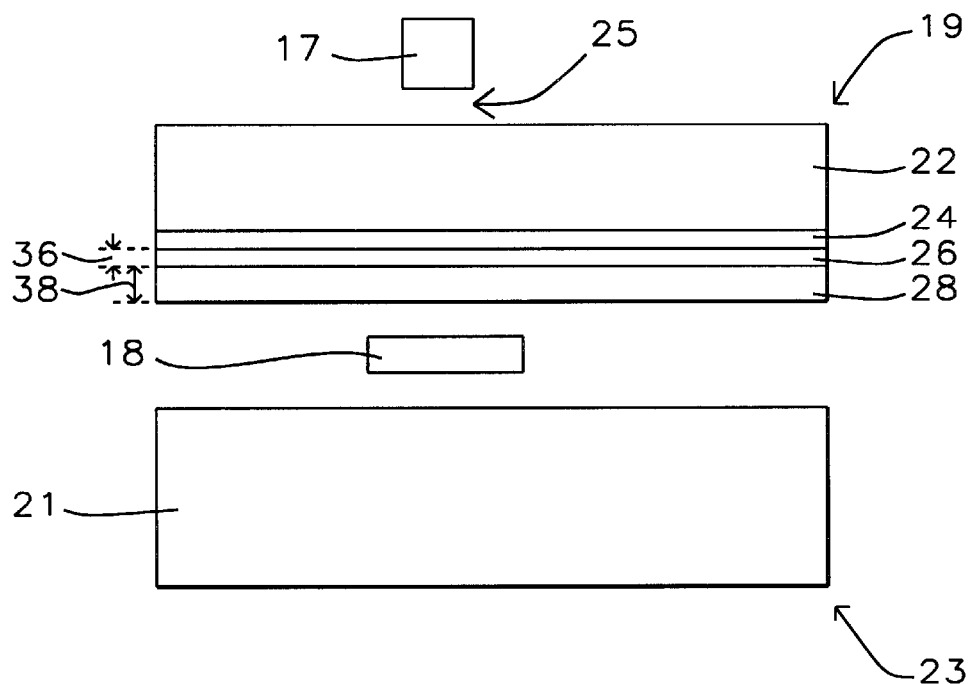
FIG. 3B shows a schematic view of the magnetic shielding arrangement of this invention for a magnetic recording and sensing device using one composite shielding element and a shielding element of a single layer of ferromagnetic material.

Refer now to FIG. 3B for a description of a second embodiment of the magnetic shielding arrangement of this invention. FIG. 3B shows a view of the shielding arrangement looking out of the magnetic media 10 shown in FIG. 1. FIG. 3B shows a magnetic sensing device 18 between a first magnetic shielding element 19 and a third magnetic shielding element 23. The first magnetic shielding element 19 is between the magnetic sensing device 18 and the second pole piece 17 of the magnetic writing means. The first magnetic shielding element 19 also serves as the first pole piece of the magnetic writing means. The magnetic sensing device 18 comprises sensing elements such as a spin valve, anisotropic magnetoresistive, spin dependent tunneling magnetic sensing head or other giant magnetoresistive magnetic sensing head.

As shown in FIG. 3B, the magnetic sensing device 18 is between the first magnetic shielding element 19 and the third magnetic shielding element 23. In this embodiment the first magnetic shielding element 19 has the same construction as the first magnetic shielding element of the previous embodiment. As shown in FIG. 3B, the first magnetic shielding element 19 has a layer of first ferromagnetic material 28 having a first thickness 38. The layer of first ferromagnetic material 28 is formed on a layer of antiferromagnetic exchange material 26 having a second thickness 36. The layer of first ferromagnetic material 28 is stabilized by the layer of antiferromagnetic exchange material 26 to form a single domain state. The antiferromagnetic exchange material 26 must be oriented so that the pinning field strength is parallel to the air bearing surface. The air bearing surface is shown as a dashed line 34 in FIG. 1 and in FIG. 3B is parallel to the plane of the paper.

The first thickness 38 and second thickness 36 must be optimized so that the pinning field strength is strong enough to prevent multi-domain states in the single domain first ferromagnetic material 28 but not strong enough to significantly lower the permeability of the single domain first ferromagnetic material 28. In this example the first thickness 38 is between about 1000 and 5000 Angstroms and the second thickness 36 is between about 50 and 500 Angstroms. The first ferromagnetic material 28 can be regular permalloy like, $Ni_{80}Fe_{20}$, or a high $B_s$ material, like $Ni_{45}Fe_{55}$. The first ferromagnetic material 28 can be one or a combination of two or more of Ni, NiFe, Co, CoFe, CoZrTa, CoZrNb, FeN, FeNAl, FeNTa, FeNNb, or FeNZr. The antiferromagnetic exchange material 26 can be one of either IrMn, RhMn, RuMn, RuRhMn, FeMn, FeMnRh, FeMnCr, CrPtMn, TbCo, NiMn, PtMn, PtPdMn, NiO, CoO, or CoNiO.

As shown in FIG. 3B a layer of non-magnetic metal 24 is then formed on the layer of antiferromagnetic exchange material 26. The non-magnetic metal can be one of either V, Nb, Ta, Ti, Zr, Hf, Mo, W, or Cr. A layer of second ferromagnetic material 22 is then formed on the layer of antiferromagnetic exchange material 26. The second ferromagnetic material 22 can be one or a combination of two or more of Ni, NiFe, Co, CoFe, CoZrTa, CoZrNb, FeN, FeNAl, FeNTa, FeNNb, or FeNZr.

Referring again to FIG. 3B, in this embodiment the third shielding element 23 is formed of a layer of third ferromagnetic material 21 and not the stacked structure used for the first shielding element 19. The third ferromagnetic material 21 can be one or a combination of two or more of Ni, NiFe, Co, CoFe, CoZrTa, CoZrNb, FeN, FeNAl, FeNTa, FeNNb, or FeNZr.

As shown in FIG. 3B, the first magnetic shielding element 19, the third magnetic shielding element 23, and the magnetic sensing device 18 are arranged so that the magnetic sensing device 18 is between the first magnetic shielding element 19 and the third magnetic shielding element 23. The layer of single domain first ferromagnetic material 28 of the first shielding element 19 is adjacent to the magnetic sensing device 18.

The magnetic fields used during the writing cycle will disturb the domains in the layer of single domain first ferromagnetic material 28 and the layer of second ferromagnetic material 22 in the first shielding element 19. However, the domains in the single domain first ferromagnetic 28 material in the first shielding element 19 will relax to its single domain state with a relaxation time of pico seconds so that after a write cycle the single domain first ferromagnetic material 28 in the first shielding element 19 will be completely relaxed to its single domain state before any data is read by the magnetic sensing device 18. This relaxed layer of single domain first ferromagnetic material 28 in the first shielding element 19 will shield the magnetic sensing device 18 from field fluctuations due to domain relaxation in the layer of second ferromagnetic material 22 in the first shielding element 19 during read cycles which occur before the domains in the layer of second ferromagnetic material 22 in the first shielding element 19 have reverted to their relaxed state.

The domains of the layer of third ferromagnetic material 21 in the third shielding element 23 will be only slightly affected by the magnetic fields used during the writing cycle because the third shielding element 23 is not part of the magnetic circuit of the writing means. In addition, the disturbance of the domains of the third ferromagnetic material in the third shielding element 23 is small because of the relatively large distance between the third shielding element 23 and the gap 25 between the first shielding element 19, which is also the first pole piece of the magnetic writing means, and the second pole piece 17.

Figure 4:
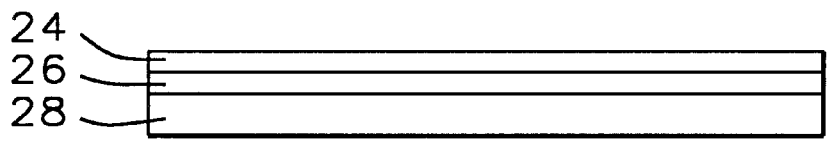
FIG. 4 shows a cross section view of a layer of single domain first ferromagnetic material, a layer of antiferromagnetic exchange material, and a layer of non-magnetic metal.
Figure 5:
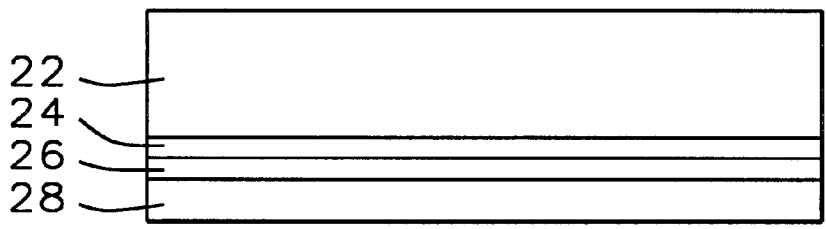
FIG. 5 shows a cross section view of a magnetic shielding element of this invention.

Refer now to FIGS. 4 and 5 for cross section views of a magnetic shielding element of this invention which describe the fabrication of the magnetic shielding elements. The layer of first ferromagnetic material 28, the layer of antiferromagnetic exchange material 26, and the layer of non-magnetic metal 24 are formed by sputtering, see FIG. 4. The layer of first ferromagnetic material 28 is stabilized by the layer of antiferromagnetic exchange material 26 to form a single domain state. This composite of the layer of single domain first ferromagnetic material 28, the layer of antiferromagnetic exchange material 26, and the layer of non-magnetic metal 24 is then used as a new seed layer to replace the normal seed layer for plating the layer of second ferromagnetic material 22, see FIG. 5.

In this description of the materials used in the various embodiments of this invention standard symbols for elements are used so that Al is Aluminum, Co is Cobalt, Cr is Chromium, Fe is Iron, Hf is Halfnium, Ir is Iridium, Mn is Manganese, Mo is Molybdenum, N is Nitrogen, Nb is Niobium, Ni is Nickel, O is Oxygen, Pd is Palladium, Pt is Platinum, Rh is Rhodium, Ru is Ruthenium, Ta is Tantalum, Tb is Terbium, Ti is Titanium, V is Vanadium, W is Tungsten, and Zr is Zirconium.

While the invention has been particularly shown and described with reference to the preferred embodiments thereof, it will be understood by those skilled in the art that various changes in form and details may be made without departing from the spirit and scope of the invention.

What is claimed is:

1. A magnetic shield element, comprising:
   a layer of first ferromagnetic material having a first surface, a second surface, and a first thickness;
   a layer of antiferromagnetic exchange material having a second thickness formed on said first surface of said layer of first ferromagnetic material;
   a layer of non-magnetic metal formed on said layer of antiferromagnetic exchange material; and
   a layer of second ferromagnetic material formed on said layer of non-magnetic metal.

2. The magnetic shield element of claim 1 wherein said first thickness is between about 1000 and 5000 Angstroms and said second thickness is between about 50 and 500 Angstroms.

3. The magnetic shield element of claim 1 wherein said antiferromagnetic exchange material is one of either IrMn, RhMn, RuMn, RuRhMn, FeMn, FeMnRh, FeMnCr, CrPtMn, TbCo, NiMn, PtMn, PtPdMn, NiO, CoO, or CoNiO.

4. The magnetic shield element of claim 1 wherein said first ferromagnetic material is $Ni_{80}Fe_{20}$ or $Ni_{45}Fe_{55}$.

5. The magnetic shield element of claim 1 wherein said first ferromagnetic material is one of either Ni, NiFe, Co, CoFe, CoZrTa, CoZrNb, FeN, FeNAl, FeNTa, FeNNb, or FeNZr.

6. The magnetic shield element of claim 1 wherein said layer of non-magnetic metal is one of either V, Nb, Ta, Ti, Zr, Hf, Mo, W, or Cr.

7. The magnetic shield element of claim 1 wherein said second ferromagnetic material is one of either Ni, NiFe, Co, CoFe, CoZrTa, CoZrNb, FeN, FeNAl, FeNTa, FeNNb, or FeNZr.

8. A magnetic recording and sensing device, comprising:
a first magnetic shield element, comprising a layer of first ferromagnetic material having a first surface, a second surface, and a first thickness; a layer of antiferromagnetic exchange material having a second thickness formed on said first surface of said layer of said first ferromagnetic material; a layer of non-magnetic metal formed on said layer of said antiferromagnetic exchange material; and a layer of second ferromagnetic material formed on said layer of said non-magnetic metal;
a second magnetic shield element, comprising a layer of said first ferromagnetic material having a first surface, a second surface, and said first thickness; a layer of said antiferromagnetic exchange material having said second thickness formed on said first surface of said layer of said first ferromagnetic material; a layer of said non-magnetic metal formed on said layer of said antiferromagnetic exchange material; and a layer of said second ferromagnetic material formed on said layer of said non-magnetic metal; and
a magnetic sensing element disposed between said second surface of said first ferromagnetic material of said first magnetic shield element and said second surface of said first ferromagnetic material of said second magnetic shield element.

9. The magnetic recording and sensing device of claim 8 wherein said magnetic sensing device comprises a spin valve, anisotropic magnetoresistive, spin dependent tunneling magnetic sensing head.

10. The magnetic recording and sensing device of claim 8 wherein said magnetic sensing device comprises a giant magnetoresistive magnetic sensing head.

11. The magnetic recording and sensing device of claim 8 further comprising a magnetic writing element located so that either said first magnetic shield element or said second magnetic shield element is between said magnetic writing element and said magnetic sensing device.

12. The magnetic recording and sensing device of claim 11 wherein said magnetic writing element comprises an inductive coil.

13. The magnetic recording and sensing device of claim 8 wherein said first thickness is between about 1000 and 5000 Angstroms and said second thickness is between about 50 and 500 Angstroms.

14. The magnetic recording and sensing device of claim 8 wherein said antiferromagnetic exchange material is one of either IrMn, RhMn, RuMn, RuRhMn, FeMn, FeMnRh, FeMnCr, CrPtMn, TbCo, NiMn, PtMn, PtPdMn, NiO, CoO, or CoNiO.

15. The magnetic recording and sensing device of claim 8 wherein said first ferromagnetic material is $Ni_{80}Fe_{20}$ or $Ni_{45}Fe_{55}$.

16. The magnetic recording and sensing device of claim 8 wherein said first ferromagnetic material is one of either Ni, NiFe, Co, CoFe, CoZrTa, CoZrNb, FeN, FeNAl, FeNTa, FeNNb, or FeNZr.

17. The magnetic recording and sensing device of claim 8 wherein said layer of non-magnetic metal is one of either V, Nb, Ta, Ti, Zr, Hf, Mo, W, or Cr.

18. The magnetic recording and sensing device of claim 8 wherein said second ferromagnetic material is one of either Ni, NiFe, Co, CoFe, CoZrTa, CoZrNb, FeN, FeNAl, FeNTa, FeNNb, or FeNZr.

19. A magnetic recording and sensing device, comprising:
a magnetic writing means;
a first magnetic shield element, comprising a layer of first ferromagnetic material having a first surface, a second surface, and a first thickness; a layer of antiferromagnetic exchange material having a second thickness formed on said first surface of said layer of said first ferromagnetic material; a layer of non-magnetic metal formed on said layer of said antiferromagnetic exchange material; and a layer of second ferromagnetic material having a first surface and said second surface formed on said layer of said non-magnetic metal so that said first surface of said layer of second ferromagnetic material contacts said layer of non-magnetic metal;
a second magnetic shield element, wherein said second magnetic shielding element is a layer of third ferromagnetic material;
a magnetic sensing element disposed between said second surface of said first ferromagnetic material of said first magnetic shield element and said second magnetic shield element; and
a magnetic writing means having a ferromagnetic second pole piece disposed adjacent to said second surface of said layer of second ferromagnetic material of said first magnetic shield element, wherein said first magnetic shield element is a first pole piece of said magnetic writing means.

20. The magnetic recording and sensing device of claim 19 wherein said magnetic sensing device comprises a spin valve, anisotropic magnetoresistive, spin dependent tunneling magnetic sensing head.

21. The magnetic recording and sensing device of claim 19 wherein said magnetic sensing device comprises a giant magnetoresistive magnetic sensing head.

22. The magnetic recording and sensing device of claim 19 wherein said first thickness is between about 1000 and 5000 Angstroms and said second thickness is between about 50 and 500 Angstroms.

23. The magnetic recording and sensing device of claim 19 wherein said antiferromagnetic exchange material is one of either IrMn, RhMn, RuMn, RuRhMn, FeMn, FeMnRh, FeMnCr, CrPtMn, TbCo, NiMn, PtMn, PtPdMn, NiO, CoO, or CoNiO.

24. The magnetic recording and sensing device of claim 19 wherein said first ferromagnetic material is $Ni_{80}Fe_{20}$ or $Ni_{45}Fe_{55}$.

25. The magnetic recording and sensing device of claim 19 wherein said first ferromagnetic material is one of either Ni, NiFe, Co, CoFe, CoZrTa, CoZrNb, FeN, FeNAl, FeNTa, FeNNb, or FeNZr.

26. The magnetic recording and sensing device of claim 19 wherein said layer of non-magnetic metal is one of either V, Nb, Ta, Ti, Zr, Hf, Mo, W, or Cr.

27. The magnetic recording and sensing device of claim 19 wherein said second ferromagnetic material is one of either Ni, NiFe, Co, CoFe, CoZrTa, CoZrNb, FeN, FeNAl, FeNTa, FeNNb, or FeNZr.

28. The magnetic recording and sensing device of claim 19 wherein said third ferromagnetic material is one of either Ni, NiFe, Co, CoFe, CoZrTa, CoZrNb, FeN, FeNAl, FeNTa, FeNNb, or FeNZr.

* * * * *